(12) United States Patent
Nagasaka et al.

(10) Patent No.: US 10,349,338 B2
(45) Date of Patent: Jul. 9, 2019

(54) DETERMINING WHETHER TO CONFIGURE A USER TERMINAL IN A COUNTRY BASED ON AUTHENTICATION

(71) Applicant: KYOCERA CORPORATION, Kyoto (JP)

(72) Inventors: Yushi Nagasaka, Ritto (JP); Noriyoshi Fukuta, Inagi (JP); Chiharu Yamazaki, Ota-ku (JP); Masato Fujishiro, Yokohama (JP); Kugo Morita, Higashiomi (JP); Susumu Kashiwase, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/553,221

(22) PCT Filed: Feb. 22, 2016

(86) PCT No.: PCT/JP2016/054988
§ 371 (c)(1),
(2) Date: Aug. 24, 2017

(87) PCT Pub. No.: WO2016/136647
PCT Pub. Date: Sep. 1, 2016

(65) Prior Publication Data
US 2018/0242221 A1 Aug. 23, 2018

(30) Foreign Application Priority Data
Feb. 25, 2015 (JP) .................................. 2015-035686

(51) Int. Cl.
*H04W 48/04* (2009.01)
*H04W 48/16* (2009.01)
(Continued)

(52) U.S. Cl.
CPC ............. *H04W 48/04* (2013.01); *H04M 1/00* (2013.01); *H04W 8/24* (2013.01); *H04W 12/06* (2013.01);
(Continued)

(58) Field of Classification Search
CPC ..... H04W 48/04; H04W 48/16; H04W 12/06; H04W 8/24; H04W 3/42; H04W 1/00;
(Continued)

(56) References Cited

U.S. PATENT DOCUMENTS

2008/0016557 A1 * 1/2008 Yang .................. H04L 63/0853
726/9
2009/0253459 A1 * 10/2009 Naganuma ........... H04B 1/0475
455/550.1
(Continued)

FOREIGN PATENT DOCUMENTS

JP    2009-253479 A    10/2009

OTHER PUBLICATIONS

International Search Report issued in PCT/JP2016/054988; dated May 17, 2016.
(Continued)

*Primary Examiner* — Meless N Zewdu
(74) *Attorney, Agent, or Firm* — Studebaker & Brackett PC

(57) ABSTRACT

A network apparatus according to an embodiment performs communication with a user terminal comprising a first communication unit configured to perform communication using a first radio access technology and a second communication unit configured to perform communication using a second radio access technology, by using the first access technology. The network apparatus comprises: a receiver configured to receive, from the user terminal, authentication related information on a country where the user terminal is
(Continued)

legally authenticated for transmission by the second communication unit; and a controller configured to determine, based on the authentication related information, whether or not communication by the second communication unit can be configured to the user terminal.

8 Claims, 8 Drawing Sheets

(51) Int. Cl.
    *H04W 8/24*     (2009.01)
    *H04M 1/00*     (2006.01)
    *H04W 12/06*     (2009.01)
    *H04W 36/36*     (2009.01)
    *H04W 60/00*     (2009.01)
    *H04W 88/06*     (2009.01)
    *G06T 1/00*     (2006.01)
    *H04W 8/12*     (2009.01)
    *H04W 84/12*     (2009.01)

(52) U.S. Cl.
    CPC ........... *H04W 36/36* (2013.01); *H04W 48/16* (2013.01); *H04W 60/00* (2013.01); *G06T 1/0021* (2013.01); *H04W 8/12* (2013.01); *H04W 84/12* (2013.01); *H04W 88/06* (2013.01)

(58) Field of Classification Search
    CPC ..... H04W 36/36; H04W 88/06; H04W 48/12; H04W 48/14; H04W 48/18; H04W 48/20; H04W 60/04; H04W 76/15; H04W 76/16; H04W 84/12; H04W 84/042; H04W 88/18; H04W 8/08; H04W 8/18; H04W 8/02; H04W 8/04; H04W 8/06; H04W 4/50; H04W 8/12; H04W 60/00; H04W 12/00; H04W 12/0605; H04W 12/0602; H04W 88/10; H04W 92/00; H04M 3/42; H04M 1/00; H04T 2001/207; H04T 2001/217; G06T 1/0021

See application file for complete search history.

(56) References Cited

U.S. PATENT DOCUMENTS

| | | | |
|---|---|---|---|
| 2010/0151854 A1* | 6/2010 | Wang | H04W 8/183 455/432.1 |
| 2011/0059722 A1* | 3/2011 | Abdel-Kader | H04M 1/72536 455/404.2 |
| 2011/0159878 A1* | 6/2011 | Bender | H04M 7/0057 455/445 |
| 2014/0287746 A1* | 9/2014 | Faccin | H04W 48/18 455/433 |
| 2015/0215844 A1* | 7/2015 | Davis | H04W 8/12 455/432.1 |
| 2018/0027486 A1* | 1/2018 | Corradino | H04W 8/18 370/254 |

OTHER PUBLICATIONS

Qualcomm Incorporated; Study Item proposal on E-UTRAN and WLAN Aggregation; 3GPP TSG RAN Meeting #64; RP-140738; Jun. 10-13, 2014; pp. 1-5; Sophia Antipolis, France.

* cited by examiner

| IMEI(TAC):A | ⇨ | REGULATION (JAPAN) OK | REGULATION (USA/CANADA) OK | REGULATION (EU) OK |
|---|---|---|---|---|
| IMEI(TAC):B | ⇨ | REGULATION (JAPAN) OK | REGULATION (USA/CANADA) OK | REGULATION (EU) NG |

DETERMINING WHETHER TO CONFIGURE A USER TERMINAL IN A COUNTRY BASED ON AUTHENTICATION

TECHNICAL FIELD

The present application relates to a user terminal capable of performing communication using a plurality of radio access technologies, and a network apparatus capable of performing communication with the user terminal.

BACKGROUND ART

In recent years, it has been anticipated that a user terminal performs communication by using a plurality of radio access technologies (RATs). For example, in LTE (Long Term Evolution), for which specifications are formulated in 3GPP (3rd Generation Partnership Project), which is a project aiming to standardize a cellular communication technology, a technology combining the use of cellular communication (LTE communication) and WLAN communication for transmitting and receiving data of a user terminal has been proposed (Non Patent Document 1).

Here, in order to perform transmission using a specific radio access technology (WLAN communication, for example), the user terminal (terminal apparatus) needs to meet the requirements prescribed in laws or ordinances (Wireless Telegraphy Act). The laws or ordinances are stipulated in each country, and the user terminal obtains usage permission (authentication) by meeting the requirements of the laws or ordinances in each country. In the authenticated country, the user terminal can legally perform transmission by using a specific radio access technology.

PRIOR ART DOCUMENT

Non-Patent Document

Non Patent Document 1: 3GPP contribution "RP-140738"

SUMMARY OF THE INVENTION

A network apparatus according to a first aspect performs communication with a user terminal comprising a first communication unit configured to perform communication using a first radio access technology and a second communication unit configured to perform communication using a second radio access technology, by using the first access technology. The network apparatus comprises: a receiver configured to receive, from the user terminal, authentication related information on a country where the user terminal is legally authenticated for transmission by the second communication unit; and a controller configured to determine, based on the authentication related information, whether or not communication by the second communication unit can be configured to the user terminal.

A user terminal according to a second aspect comprises a first communication unit configured to perform communication using a first radio access technology and a second communication unit configured to perform communication using a second radio access technology. The user terminal comprises: a controller configured to notify a network apparatus, via the first communication unit, of authentication related information on a country where the user terminal is legally authenticated for transmission by the second communication unit.

A user terminal according to a third aspect comprises a first communication unit configured to perform communication by a first radio access technology and a second communication unit configured to perform communication by a second radio access technology. The user terminal comprises: a storage unit configured to store authentication related information on a country where the user terminal is legally authenticated for transmission by the second communication unit; and a controller configured to obtain, via the first communication unit, determination information for determining whether or not the user terminal is legally authenticated for transmission by the second communication unit in a country where the user terminal is located. The controller determines, based on the authentication related information and the determination information, whether or not the transmission by the second communication unit can be executed in the country where the user terminal is located.

A network apparatus according to a fourth aspect performs communication with a user terminal including a first communication unit configured to perform communication using a first radio access technology and a second communication unit configured to perform communication using a second radio access technology, by using the first access technology. The network apparatus comprises: a receiver configured to receive information about a model identifier of the user terminal, from the user terminal; and, a controller configured to obtain, based on the information on the model identifier, authentication related information on a country where the user terminal is legally authenticated for transmission by the second communication unit. The controller determines, based on the authentication related information, whether or not communication by the second communication unit can be configured to the user terminal.

DESCRIPTION OF THE EMBODIMENT

[Overview of Embodiment]

Figure 1:
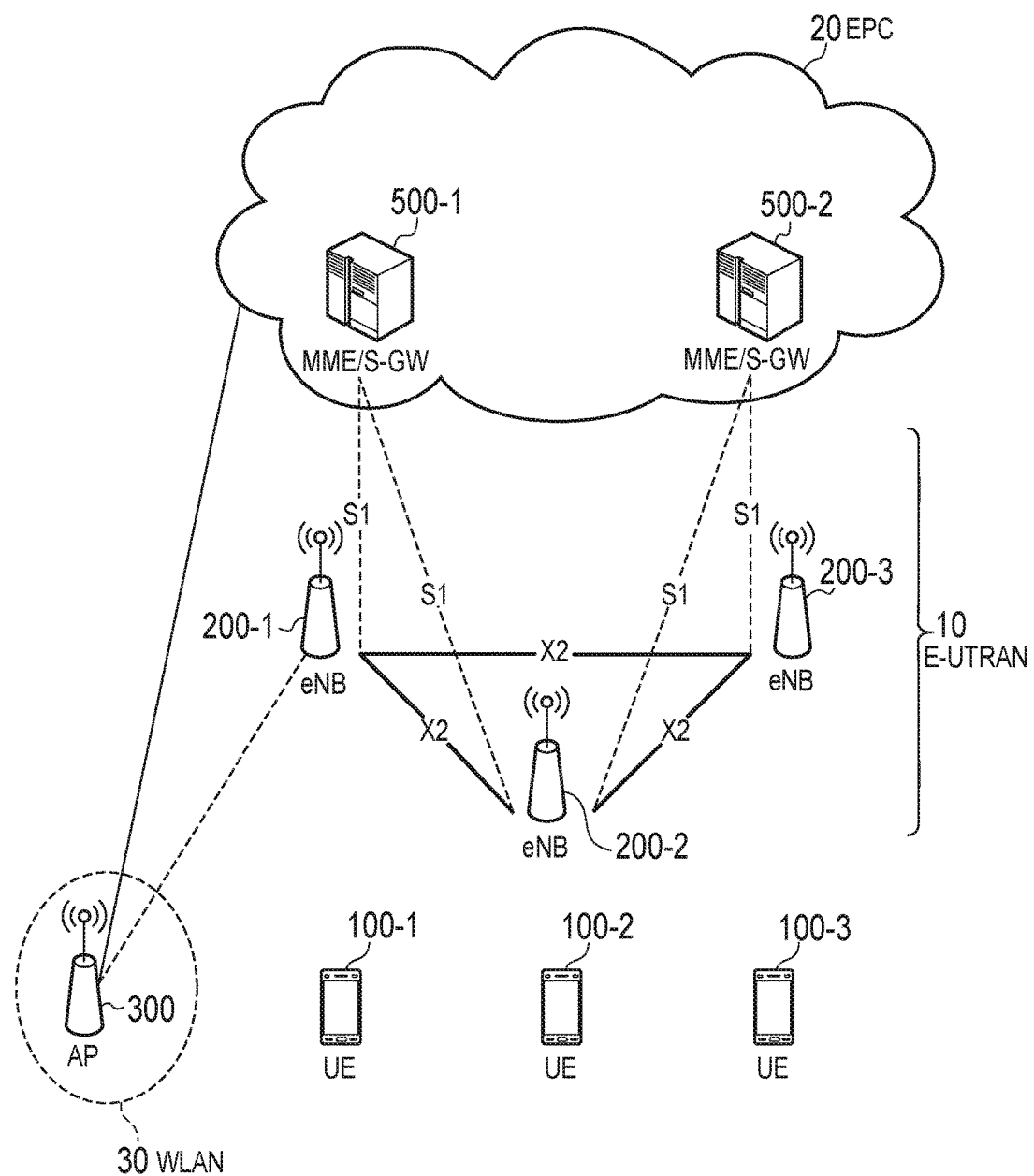
FIG. 1 is a diagram illustrating a system configuration.

If a user terminal performs communication by using a plurality of radio access technologies, a case is assumed in which a network apparatus transmits, to a user terminal in a first radio access technology (LTE, for example), a message about a communication configuration using a second radio access technology (WLAN, for example). In such a case, the user terminal starts the communication using the second radio access technology, after performing the configuration on the basis of the message.

However, if the user terminal (terminal apparatus) is located in a country where the transmission using the second radio access technology has not been authenticated, transmission by the user terminal is illegal. Therefore, there is a possibility that the network apparatus configured to transmit the message about the communication configuration using the second radio access technology encourages the illegal usage by the user terminal (terminal apparatus) not having obtained the authentication (usage permission) by laws or ordinances.

Thus, the present embodiment provides a network apparatus and a user terminal capable of preventing illegal usage by the user terminal (terminal apparatus) resulting from a message from a network apparatus.

A network apparatus according to a first embodiment performs communication with a user terminal comprising a first communication unit configured to perform communication using a first radio access technology and a second communication unit configured to perform communication using a second radio access technology, by using the first access technology. The network apparatus comprises: a receiver configured to receive, from the user terminal, authentication related information on a country where the user terminal is legally authenticated for transmission by the second communication unit; and a controller configured to determine, based on the authentication related information, whether or not communication by the second communication unit can be configured to the user terminal.

In a first embodiment, the authentication related information is list information indicating a country where the user terminal is legally authenticated. The controller determines that the communication by the second communication unit can be configured to the user terminal, if the list information includes information about a country where the user terminal is located.

In a first embodiment, the authentication related information is image information indicating a country where the user terminal is legally authenticated. The controller determines that the communication by the second communication unit can be configured to the user terminal, if the image information includes an image applied to a terminal apparatus legally authenticated in the country where the user terminal is located.

In a first embodiment, the authentication related information is based on information input by a user operation to the user terminal.

In a first embodiment, the controller notifies the user terminal of configuration information indicating a configuration for the communication by the second communication unit, upon determining that the communication by the second communication unit can be configured to the user terminal.

In a first embodiment, the controller determines that the user terminal can be configured to allow for reception rather than transmission by the second communication unit, if the user terminal is not legally authenticated for the transmission by the second communication unit in the country where the user terminal is located.

A user terminal according to a first embodiment comprises a first communication unit configured to perform communication using a first radio access technology and a second communication unit configured to perform communication using a second radio access technology. The user terminal comprises: a controller configured to notify a network apparatus, via the first communication unit, of authentication related information on a country where the user terminal is legally authenticated for transmission by the second communication unit.

A user terminal according to a second embodiment comprises a first communication unit configured to perform communication by a first radio access technology and a second communication unit configured to perform communication by a second radio access technology. The user terminal comprises: a storage unit configured to store authentication related information on a country where the user terminal is legally authenticated for transmission by the second communication unit; and a controller configured to obtain, via the first communication unit, determination information for determining whether or not the user terminal is legally authenticated for transmission by the second communication unit in a country where the user terminal is located. The controller determines, based on the authentication related information and the determination information, whether or not the transmission by the second communication unit can be executed in the country where the user terminal is located.

In a second embodiment, the controller notifies a network apparatus, via the first communication unit, of information based on a result of the determination.

In a second embodiment, the controller updates, based on the result of the determination, capability information of the user terminal. The controller notifies the network apparatus of the updated capability information as information based on the result of the determination.

In a second embodiment (modification), the first communication unit receives a predetermined message about a communication configuration using the second radio access technology. The controller notifies the network apparatus of the information based on the result of the determination as a response to the predetermined message.

In a second embodiment (modification), the controller includes, if notifying a negative acknowledgment to the predetermined message, reason information indicating that the user terminal is not legally authenticated for transmission by the second communication unit, into the negative acknowledgment.

In a second embodiment (modification), the controller notifies a negative acknowledgment to the predetermined message. The controller notifies, during reestablishment of a connection with a base station after detecting a radio link failure, that the user terminal is not legally authenticated for transmission by the second communication unit, as a reason for the negative acknowledgment.

A network apparatus according to a third embodiment performs communication with a user terminal including a first communication unit configured to perform communication using a first radio access technology and a second communication unit configured to perform communication using a second radio access technology, by using the first access technology. The network apparatus comprises: a receiver configured to receive information about a model identifier of the user terminal, from the user terminal; and, a controller configured to obtain, based on the information on the model identifier, authentication related information on a country where the user terminal is legally authenticated for transmission by the second communication unit. The controller determines, based on the authentication related information, whether or not communication by the second communication unit can be configured to the user terminal.

[First Embodiment]

Below, with reference to the figure, an embodiment in which an LTE system is a cellular communication system configured in compliance with the 3GPP standards and which is linked with a wireless LAN (WLAN) system will be described.

(System Configuration)

FIG. 1 is a system configuration diagram according to a first embodiment. As shown in FIG. 1, the LTE system includes a plurality of UEs (User Equipments) 100, E-UTRAN (Evolved-UMTS Terrestrial Radio Access Network) 10, and EPC (Evolved Packet Core) 20.

The E-UTRAN 10 corresponds to cellular RAN. The EPC 20 corresponds to a core network. The E-UTRAN 10 and the EPC 20 constitute a network of an LTE system.

The UE 100 is a mobile radio communication apparatus. The UE 100 corresponds to a user terminal. The UE 100 is a terminal (dual terminal) that supports both a cellular communication scheme and a WLAN communication scheme.

The E-UTRAN 10 includes a plurality of eNBs 200 (evolved Node-Bs). The eNB 200 corresponds to a base station. The eNB 200 manages one or a plurality of cells and performs radio communication with the UE 100 which exists on the cell of the eNB 200. The "cell" is used as a term indicating a minimum unit of a radio communication area, and is also used as a term indicating a function of performing radio communication with the UE 100. The eNB 200 has a radio resource management (RRM) function, a routing function of user data, and a measurement control function for mobility control and scheduling.

The eNBs 200 are connected mutually via an X2 interface. The eNB 200 is connected to MME (Mobility Management Entity)/S-GW (Serving-Gateway) 500 included in the EPC 20 via an S1 interface.

The EPC 20 includes a plurality of MMEs/S-GWs 500. The MME is a network node for performing various mobility controls, for example, for the UE 100, and corresponds to a control station. The S-GW is a network node that performs transfer control of user data and corresponds to a mobile exchange center.

A WLAN 30 includes a WLAN access point (hereinafter, referred to as "AP") 300. The AP 300 is an AP (Operator controlled AP) managed by a NW operator of the LTE system, for example.

The WLAN 30 is configured to comply with standards of IEEE 802.11, for example. The AP 300 performs WLAN communication with the UE 100 in a frequency band different from a cellular frequency band. Generally, the WLAN communication is performed through an unlicensed band. The cellular communication is performed through a licensed band. The AP 300 is connected to the EPC 20 via a router, etc.

In addition to a case where the eNB 200 and the AP 300 are separate nodes, the eNB 200 and the AP 300 may be "Collocated" by regarding the eNB 200 and the AP 300 as the identical node. A configuration of an eNB 200 that is a cellular/WLAN collocated eNB 200 configured to support the cellular communication and the WLAN communication (hereinafter, referred to as a "cellular/WLAN collocated eNB 200") will be described later. Alternatively, the eNB 200 and the AP 300 may be mutually connected via a direct interface.

The EPC 20 may further include an access network discovery and selection function (ANDSF) server. The ANDSF server manages ANDSF information related to the WLAN 30. The ANDSF server provides the UE 100 with the ANDSF information related to the WLAN 30.

Subsequently, a configuration of the UE 100, the eNB 200, and the AP 300 will be described.

Figure 2:
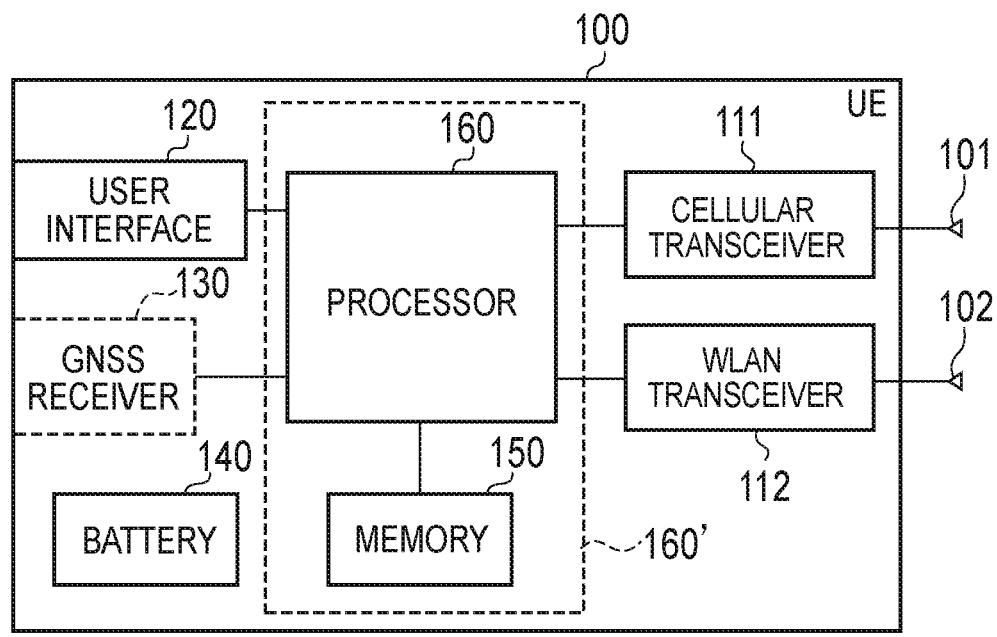
FIG. 2 is a block diagram of a UE.

FIG. 2 is a block diagram of the UE 100. As illustrated in FIG. 2, the UE 100 includes: antennas 101 and 102; a cellular transceiver 111; a WLAN transceiver 112; a user interface 120; a GNSS (Global Navigation Satellite System) receiver 130; a battery 140; a memory 150; and a processor 160. The memory 150 and the processor 160 constitute a controller. The UE 100 may not have the GNSS receiver 130 and the user interface 120. Furthermore, the memory 150 may be integrally formed with the processor 160, and this set (that is, a chipset) may be called a processor 160'.

The antenna 101 and the cellular transceiver 111 are used for transmitting and receiving cellular radio signals. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used to transmit and receive a WLAN radio signal. The WLAN transceiver 112 converts a baseband signal output from the processor 160 into a WLAN radio signal, and transmits the same from the antenna 102. Further, the WLAN transceiver 112 converts a WLAN radio signal received by the antenna 102 into a baseband signal, and outputs the same to the processor 160.

The user interface 120 is an interface for use by a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for processes by the processor 160. The processor 160 includes a baseband processor that performs modulation and demodulation, encoding and decoding and the like on the baseband signal and a CPU that performs various processes by executing the program stored in the memory 150. The processor 160 may further include a codec that performs encoding and decoding on audio and video signals. The processor 160 executes various processes and various communication protocols described later.

Figure 3:
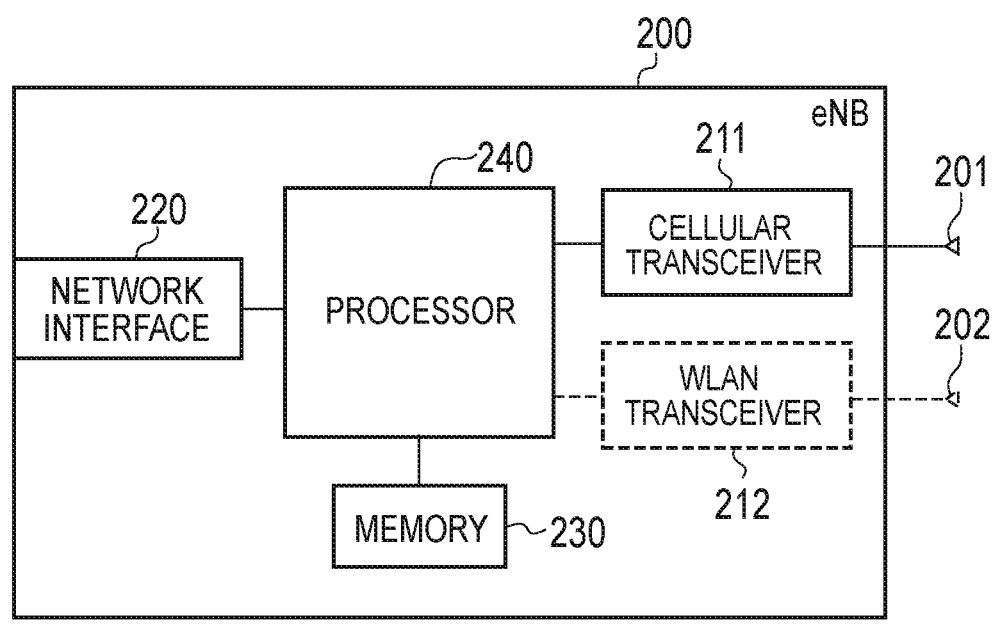
FIG. 3 is a block diagram of an eNB.

FIG. 3 is a block diagram of the eNB 200. As illustrated in FIG. 3, the eNB 200 includes an antenna 201, a cellular transceiver 211, a network interface 220, a memory 230, and a processor 240. The memory 230 and the processor 240 constitute a controller. Furthermore, the memory 230 may be integrally formed with the processor 240, and this set (that is, a chipset) may be called a processor.

The antenna 201 and the cellular transceiver 211 are used for transmitting and receiving a cellular radio signal. The cellular transceiver 211 converts the baseband signal output from the processor 240 into the cellular radio signal, and transmits the same from the antenna 201. Furthermore, the cellular transceiver 211 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. The network interface 220 may be connected with the AP 300 via a direct interface.

The memory 230 stores a program to be executed by the processor 240 and information to be used for a process by the processor 240. The processor 240 includes a baseband processor that performs modulation and demodulation, encoding and decoding and the like on the baseband signal and a CPU that performs various processes by executing the program stored in the memory 230. The processor 240 implements various processes and various communication protocols described later.

In addition, when the eNB 200 is a cellular/WLAN collocated-type, the eNB 200 further includes an antenna 202 and a WLAN transceiver 212. The antenna 202 and the WLAN transceiver 212 are used to transmit and receive a WLAN radio signal. The WLAN transceiver 212 converts a baseband signal output from the processor 240 into a WLAN radio signal and transmits the same from the antenna 202. Further, the WLAN transceiver 212 converts a WLAN radio signal received by the antenna 202 into a baseband signal and outputs the same to the processor 240.

Figure 4:
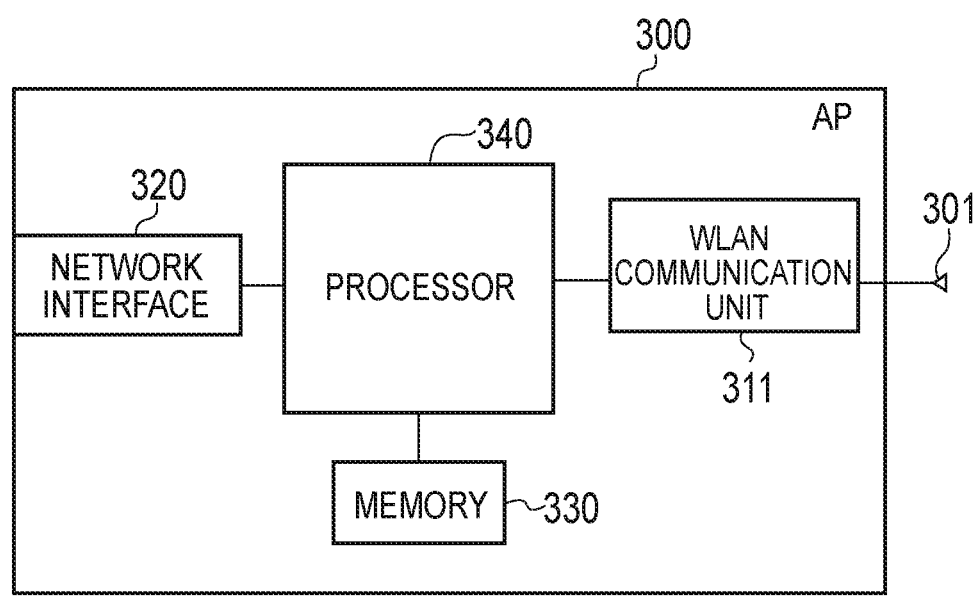
FIG. 4 is a block diagram of an AP.

FIG. 4 is a block diagram of the AP 300. As shown in FIG. 4, the AP 300 includes an antenna 301, a WLAN communication unit (WLAN transceiver) 311, a network interface 320, a memory 330, and a processor 340. The memory 330 may be integrally formed with the processor 340, and this set (that is, a chipset) may be called a processor.

The antenna 301 and the WLAN communication unit 311 are used to transmit and receive a WLAN radio signal. The WLAN communication unit 311 converts a baseband signal output from the processor 340 into a WLAN radio signal and transmits the same from the antenna 301. Further, the WLAN communication unit 311 converts a WLAN radio signal received by the antenna 301 into a baseband signal and outputs the same to the processor 340.

The network interface 320 is connected to the eNB 200 via a direct interface.

The memory 330 stores a program to be executed by the processor 340 and information to be used for a process by the processor 340. The processor 340 includes a baseband processor that performs modulation and demodulation, encoding and decoding and the like of a baseband signal, and a CPU that performs various processes by executing the program stored in the memory 330. The processor 340 executes various processes described later.

Figure 5:
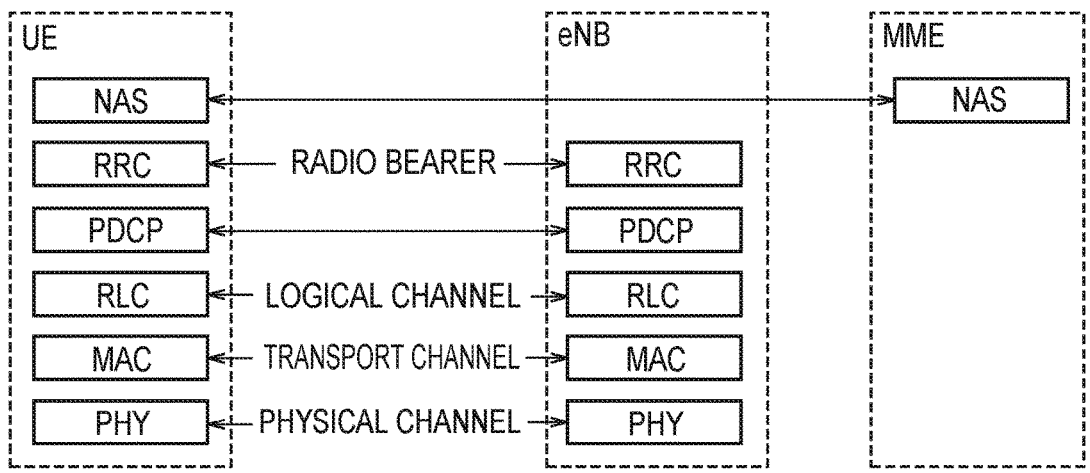
FIG. 5 is a protocol stack diagram of an LTE radio interface.

FIG. 5 is a protocol stack diagram of a radio interface in the LTE system. As shown in FIG. 5, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, user data and control signals are sent via a physical channel.

The MAC layer performs priority control of data, and a retransmission process and the like by a hybrid ARQ (HARQ). Between the MAC layer of the UE 100 and the MAC layer of the eNB 200, user data and control signals are sent via a transport channel. The MAC layer of the eNB 200 includes a scheduler for deciding a transport format (a transport block size and a modulation and coding scheme) of an uplink and a downlink, and a resource block to be assigned to the UE 100.

The RLC layer sends data to an RLC layer of a reception side by using the functions of the MAC layer and the physical layer. Between the RLC layer of the UE 100 and the RLC layer of the eNB 200, user data and control signals are sent via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (RRC message) for various types of settings is sent. The RRC layer controls the logical channel, the transport channel, and the physical channel according to the establishment, re-establishment, and release of a radio bearer. When a connection (RRC connection) is established between the RRC of the UE 100 and the RRC of the eNB 200, the UE 100 is in a RRC connected state, and when the connection is not established, the UE 100 is in an RRC idle state.

An NAS (Non-Access Stratum) layer positioned above the RRC layer performs session management, mobility management, and the like. The MME 300 transmits and receives NAS messages to and from the UE 100.

Moreover, in the LTE system, OFDMA (Orthogonal Frequency Division Multiple Access) is applied to a downlink, and SC-FDMA (Single Carrier Frequency Division Multiple Access) is applied to an uplink, respectively.

A radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol. Among radio resources allocated to the UE 100, a frequency resource can be designated by a resource block and a time resource can be designated by a subframe (or slot).

(Basic Operation of Cellular/WLAN Aggregation)

Figure 6:
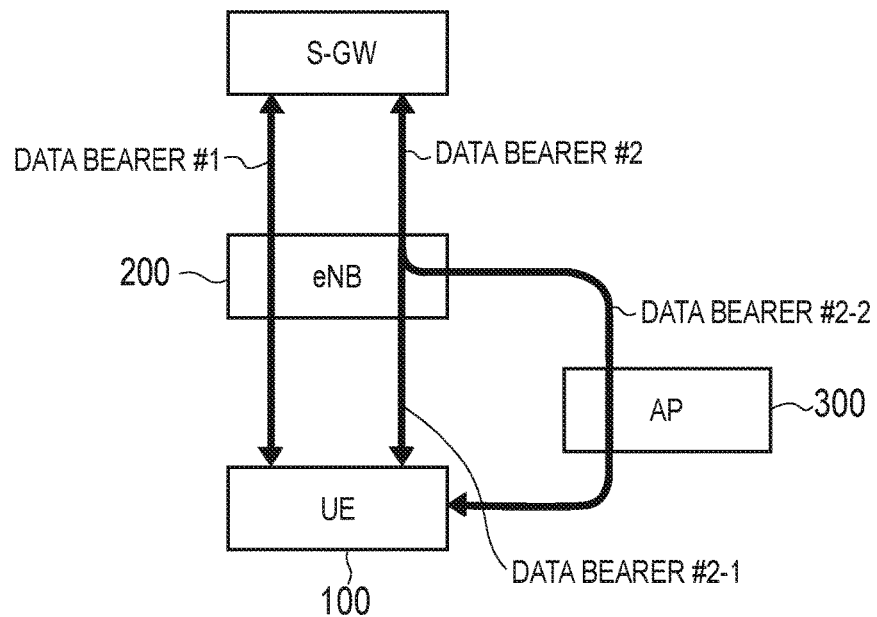
FIG. 6 is a diagram illustrating a basic operation of cellular/WLAN aggregation.

A basic operation of the cellular/WLAN aggregation will be described by using FIG. 6. FIG. 6 is a diagram illustrating the basic operation of the cellular/WLAN aggregation.

The cellular/WLAN aggregation is a communication scheme in which data (traffic) of the UE 100 is transmitted and received by using both the cellular communication and the WLAN communication. Specifically, in the cellular/WLAN aggregation, traffic (user data) belonging to an identical or different data bearer is transmitted and received by using both the cellular communication and the WLAN communication.

In FIG. 6, between the UE 100 and the S-GW 500 (EPC 20), a data bearer #1 (first data bearer) that does not pass through the AP 300 but passes through the eNB 200, and a data bearer #2 (second data bearer) that passes through the AP 300 and the eNB 200, are established. It is noted that if the cellular/WLAN aggregation is executed, the data bearer #2 only may be established, and both the data bearer #1 and the data bearer #2 may be established.

The data bearer #1 is a data bearer for a normal cellular communication. On the other hand, the data bearer #2 is a data bearer for the cellular/WLAN aggregation. The data bearer #2 is split in the eNB 200 (for example, the PDCP layer). One of the split bearers (data bearer #2-1) is terminated at the UE 100 that does not pass through the AP 300, and the other (data bearer #2-2) is terminated at the UE 100 that passes through the AP 300. It is noted that the data bearer #2-2 may be terminated at the UE 100 by passing not only through the AP 300 but also through WLAN GW (gateway apparatus) configured to accommodate the (plurality of) APs 300.

The UE 100 transmits and receives the data by using at least the data bearer #2 if the cellular/WLAN aggregation is executed.

Specifically, if the cellular/WLAN aggregation is executed, the eNB 200 divides, in the downlink, the data belonging to the data bearer #2, into data transmitted by the cellular communication (cellular-side data) and data transmitted by the WLAN communication (WLAN-side data). The eNB 200 transmits, by the cellular communication, the cellular-side data to the UE 100 by the data bearer #2-1. On the other hand, the eNB 200 transmits to the AP 300, by using a direct communication pathway, the WLAN-side data. The AP 300 transmits, by the WLAN communication, the WLAN-side data received from the eNB 200, to the UE 100, by the data bearer #2-2.

On the other hand, in the uplink, the UE 100 divides the data belonging to the data bearer #2, into data transmitted by the cellular communication (cellular-side data) and data transmitted by the WLAN communication (WLAN-side data). The UE 100 transmits, by the cellular communication, the cellular-side data to the eNB 200 by the data bearer #2-1. On the other hand, the UE 100 transmits, by the WLAN communication, the WLAN-side data, to the AP 300, by the data bearer #2-2. The AP 300 transmits, by using a direct communication pathway, the WLAN-side data received from the UE 100, to the eNB 200. The eNB 200 combines (reassembles) the cellular-side data received from the UE 100 and the WLAN-side data received from the AP 300, and transmits the resultant data to the S-GW 500.

It is noted that in the cellular/WLAN aggregation, all the data belonging to the data bearer #2 may be transmitted and received by the cellular communication and all the data belonging to the data bearer #2 may be transmitted and received by the WLAN communication.

Further, description proceeds with a case where the eNB 200 and the AP 300 are separated; however, the eNB 200 may be the cellular/WLAN collocated-type eNB 200.

In the cellular/WLAN aggregation proposed in 3GPP Release 13, it is assumed that a carrier (WLAN frequency) used in the WLAN communication is used as one of serving cells. For example, it is assumed that the WLAN frequency is used as an auxiliary cell (secondary cell: SCell) in carrier aggregation (CA) or dual connectivity (DC).

It is presumed that, similarly to a conventional CA or DC, the eNB 200 notifies the UE 100 of a configuration message for adding the WLAN frequency as the SCell, based on a measurement result of a radio condition received from the UE 100. Here, if the UE 100 (terminal apparatus) is located in a country where transmission by the WLAN transceiver 112 has not been authenticated, transmission of the UE 100 by the WLAN transceiver 112 is illegal. Therefore, the eNB 200 is likely to encourage the illegal usage by the user terminal (terminal apparatus) not having obtained the authentication (usage permission) by the laws or ordinances. Thus, the method described below offers a solution to the problem.

It is noted that, an example of an act in which the eNB 200 encourages the illegal usage by the UE 100 (terminal apparatus) includes a case in which the eNB 200 transmits, to the UE 100, a configuration message (instruction) having the content described below.

instruction for transmission using a RAT (WLAN) for which the UE 100 is not authenticated instruction for switching from off to on of a communication unit (WLAN transceiver 112) configured to perform communication using a RAT for which the UE 100 is not authenticated (Operation According to First Embodiment)

Figure 7:
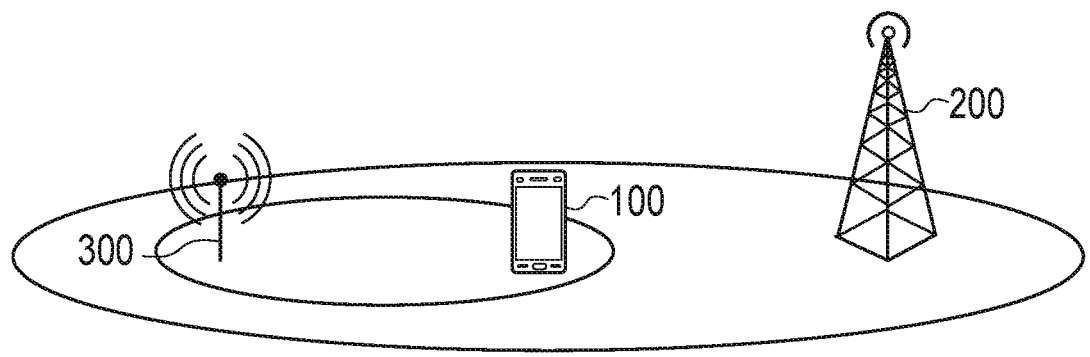
FIG. 7 is a diagram for describing an operation environment according to a first embodiment.
Figure 8:
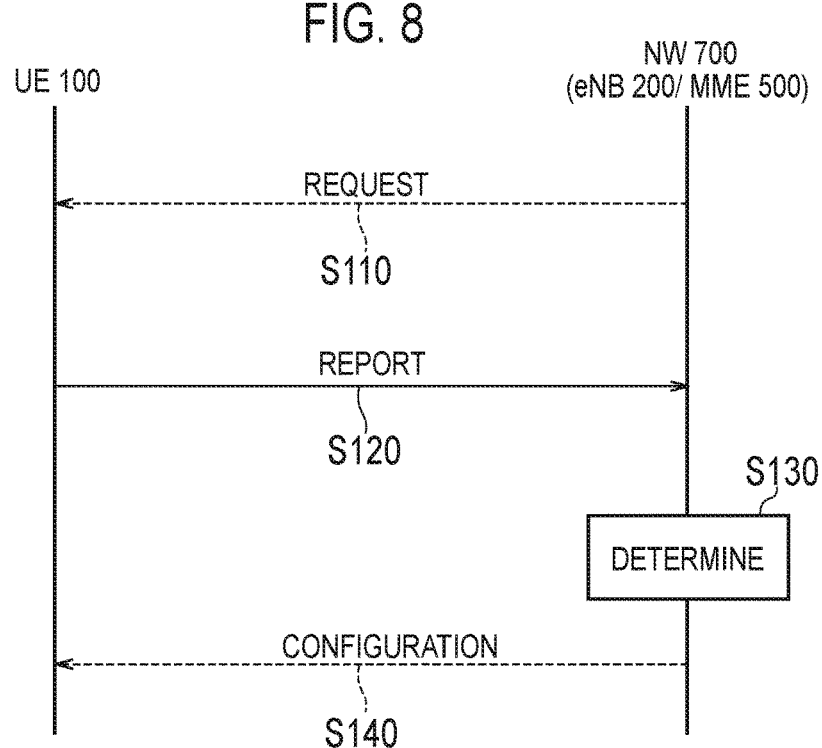
FIG. 8 is a sequence diagram for describing an operation according to the first embodiment.

Next, an operation according to a first embodiment will be described with reference to FIG. 7 and FIG. 8. FIG. 7 is a diagram for describing an operation environment according to the first embodiment. FIG. 8 is a sequence diagram for describing the operation according to the first embodiment.

As illustrated in FIG. 7, the UE 100 in the RRC connected state or in the RRC idle state is located in a cell of the eNB 200 and the UE 100 is located in a coverage of the AP 300. A whole of the coverage of the AP 300 may overlap a cell (coverage) of the eNB 200, and a part of the coverage of the AP 300 may overlap the cell (coverage) of the eNB 200. Between the eNB 200 and the AP 300, a direct communication pathway (interface) without passing through a core network is arranged. The eNB 200 and the AP 300 can exchange information by using the direct communication pathway.

As described above, the UE 100 includes: the cellular transceiver 111 capable of performing communication using the LTE that is the first RAT (radio access technology); and the WLAN transceiver 112 capable of performing communication using the WLAN that is the second RAT. Therefore, the UE 100 can perform communication using a plurality of RATs.

As illustrated in FIG. 8, in step S110, an NW 700 notifies the UE 100 of a request for authentication related information. The UE 100 receives the request via the cellular transceiver 111. It is noted that, also in the operation below, the UE 100 performs communication with the NW 700 via the cellular transceiver 111. The operation in step S110 may be omitted.

The "NW 700" is a network apparatus managed by an NW operator. The NW 700 is an eNB 200. Alternatively, the NW 700 may also be an MME 500, which is an upper node of the eNB 200.

The authentication related information is information about a country where the UE 100 is legally authenticated for transmission by the WLAN transceiver 112.

For example, the authentication related information is list information indicating a country where the UE 100 (terminal apparatus/terminal main body) is legally authenticated for transmission by the WLAN transceiver 112. If the UE 100 complies with the technical requirements prescribed by the Wireless Telegraphy Act in Japan, the list information includes information indicating Japan.

Alternatively, the authentication related information is image information indicating the country where the UE 100 is legally authenticated for transmission by the WLAN transceiver 112. In Japan, for example, the image information is information (authentication image) indicating a technical conformity mark certifying that a radio unit complies with the technical requirements prescribed by the Wireless Telegraphy Act. The image information may be image information configured by a plurality of countries where the UE 100 is legally authenticated.

Further, a digital watermark may be embedded in the image information to prevent forgery. Furthermore, in order to prevent unauthorized use of the image information, the image information may be locked so that the image information cannot be changed. In addition, except for the use as the authentication related information, the image information may be locked so that the image information cannot be retrieved from a memory.

The authentication related information may be information based on information input to the UE 100 from an operation by a user of the UE 100. For example, after verifying a technical conformity mark affixed to the UE 100 (terminal apparatus), the user performs an operation to input a country where the UE 100 is legally authenticated for transmission by the WLAN transceiver 112. The UE 100 can make, for example, list information, based on the user operation.

Alternatively, the authentication related information may be stored in the memory 150 of the UE 100. Here, the memory 150 is not a memory in a user identity module (UIM), such as an IC card mounted into the terminal apparatus, but the memory 150 is a memory within the terminal apparatus. The authentication related information may be stored beforehand in a memory within the UE 100. Alternatively, the UE 100 may store the list information generated by the user operation, in the memory within the terminal apparatus.

It is noted that the authentication related information may be updatable. For example, the authentication related information may be updated as a result of an update in software, that is a driver circuit (driver) and/or an operating system (OS) of the UE 100 (terminal apparatus). Alternatively, in a country where IEEE specifications are newly authorized, if a terminal apparatus of the same model as the UE 100 (terminal apparatus) is legally authenticated, apparatus information (authentication related information) may be updated by adding information on the country to the authentication related information. It is noted that the authentication related information may be updatable by the NW operator or a vendor handling terminal apparatuses.

In step S120, the UE 100 notifies the NW 700 of a report about the authentication related information. The UE 100 may notify the report about the authentication related information in response to the request in S110, and the UE 100 may periodically or non-periodically notify the report about the authentication related information. For example, the UE 100 may notify the report about the authentication related information in response to a user input of the authentication related information.

Furthermore, an AS layer in the UE 100 may notify the report. For example, upon obtaining the authentication related information from the memory within the terminal apparatus, the AS layer may use an RRC message to notify the eNB 200 of a report including the obtained authentication related information. It is noted that, if the MME 500 makes a determination described later, the eNB 200 may transfer the received (report about the) authentication related information to the MME 500.

Alternatively, a NAS layer in the UE 100 may notify the report. For example, upon obtaining the authentication related information from the memory within the terminal apparatus, the NAS layer may use a NAS message to notify the MME 500 of a report including the obtained authentication related information. It is noted that, if the eNB 200 makes the determination described later, the MME 500 may transfer the received (report about the) authentication related information to the eNB 200.

In step S130, the NW 700 determines whether or not communication by the WLAN transceiver 112 can be configured to the UE 100, based on the received authentication related information. That is, the NW 700 determines whether or not the UE 100 is legally authenticated for communication by the WLAN transceiver 112 in the country where the UE 100 is located.

For example, upon reception of the list information as the authentication related information, if the list information includes information on the country where the UE 100 is located, the NW 700 determines that communication by the WLAN transceiver 112 can be configured to the UE 100. On the other hand, if the list information does not include the information on the country where the UE 100 is located, the NW 700 determines that the communication (at least transmission) by the WLAN transceiver 112 cannot be configured to the UE 100.

The NW 700 holds (stores) information on the country where the UE 100 is located. If the country where the NW 700 is located and the country where the UE 100 is located are the same, the country where the NW 700 is located is stored as the country where the UE 100 is located. Furthermore, if a country where the UE 100 accessible to the NW 700 is located is fixed, the country is stored as the country where the UE 100 is located. The NW 700 makes the determination on the basis of the authentication related information, and the stored information on the country where the UE 100 is located.

Alternatively, the UE 100 may include location information obtained by the GNSS receiver 130, into the report about the authentication related information. The NW 700 makes the determination on the basis of the authentication related information included in report information, and the location information.

Furthermore, upon reception of the image information as the authentication related information, if an image applied to the terminal apparatus legally authenticated in the country where the UE 100 is located, is included in the image information, the NW 700 determines that the communication by the WLAN transceiver 112 can be configured to the UE 100. On the other hand, if the image is not included in the image information, the NW 700 determines that communication (at least transmission) by the WLAN transceiver 112 cannot be configured to the UE 100.

Similarly as described above, if the country where the NW 700 is located and the country where the UE 100 is located are the same, or if a country where the UE 100 accessible to the NW 700 is located is fixed, the NW 700 stores an image applied to the terminal apparatus legally authenticated in the country. If the UE 100 is located in Japan, the image applied to the terminal apparatus legally authenticated in the country where the UE 100 is located, is the technical conformity mark.

For example, the NW 700 compares the image information received as the authentication related information to a stored authentication image (technical conformity mark). If the authentication image is included (with a high probability) in an image indicated by the image information, the NW 700 determines that the communication by the WLAN transceiver 112 can be configured to the UE 100. Otherwise, the NW 700 determines that communication (at least transmission) by the WLAN transceiver 112 cannot be configured to the UE 100.

It is noted that, if the NW 700 determines that the communication by the WLAN transceiver 112 cannot be configured to the UE 100, that is, if the UE 100 is not legally authenticated for communication by the WLAN transceiver 112 in the country where the UE 100 is located, the NW 700 may determine that the UE 100 can be configured to allow for reception rather than transmission by the WLAN transceiver 112.

In step S140, the NW 700 notifies the UE 100 of configuration information (Configuration) indicating a configuration about the communication by the WLAN transceiver 112. For example, the NW 700 may notify the UE 100 of configuration information included in an RRCConnectionReconfiguration. The UE 100 receives the configuration information.

In the present embodiment, the configuration information is information on the cellular/WLAN aggregation. For example, the configuration information is used for ensuring that the UE 100 executes the cellular/WLAN aggregation. Alternatively, the configuration information is used for measuring a radio condition of the WLAN communication to determine whether or not the UE 100 can execute the cellular/WLAN aggregation.

In response to a determination that the communication by the WLAN transceiver 112 can be configured, the NW 700 may notify the configuration information. Alternatively, even when determining that the communication by the WLAN transceiver 112 can be configured, the NW 700 may not notify the configuration information. For example, after determining that the communication by the WLAN transceiver 112 can be configured, the NW 700 may notify the configuration information if a condition is satisfied that needs to be satisfied for transmitting the configuration information.

Upon determining that the communication by the WLAN transceiver 112 can be configured, the eNB 200 can notify, by an RRC message, the UE 100 of the configuration information. Furthermore, upon determining that the communication by the WLAN transceiver 112 can be configured, the MME 500 notifies the eNB 200 configured to manage the cell in which the UE 100 exists, of the determination result. Based on the determination result, the eNB 200 can notify the UE 100 of the configuration information.

Upon determining that the communication by the WLAN transceiver 112 cannot be configured, the NW 700 does not notify the configuration information. Alternatively, the NW 700 may notify configuration information for allowing for reception rather than transmission by the WLAN transceiver 112. The configuration information may be configuration information for measuring a radio condition of the WLAN communication for reception by the cellular/WLAN aggregation. After performing configuration for communication by the WLAN transceiver 112, based on the received configuration information, the UE 100 starts a predetermined operation according to the configuration.

It is noted that, if performing reception only by the WLAN communication, the UE 100 may notify the NW 700 of control information such as ACK/NACK, via the cellular transceiver 111. For example, the NW 700 may transfer, via a direct interface, the control information to the AP 300 configured to transmit data to the UE 100.

As described above, the NW 700 determines, based on the authentication related information, whether or not the communication by the WLAN transceiver 112 can be configured to the UE 100. Thus, if the UE 100 has not legally obtained authentication (usage permission) for transmission using WLAN, the NW 700 is capable of not notifying the UE 100 of the configuration information for communication by the WLAN transceiver 112. Alternatively, the NW 700 can notify the UE 100 of only the configuration information for allowing for reception rather than transmission by the WLAN transceiver 112. Therefore, based on the configuration information from the NW 700, the UE 100 does not perform transmission by the WLAN transceiver 112, and thus, illegal usage by the terminal apparatus can be prevented.

[Second Embodiment]
(Operation According to Second Embodiment)

Figure 9:
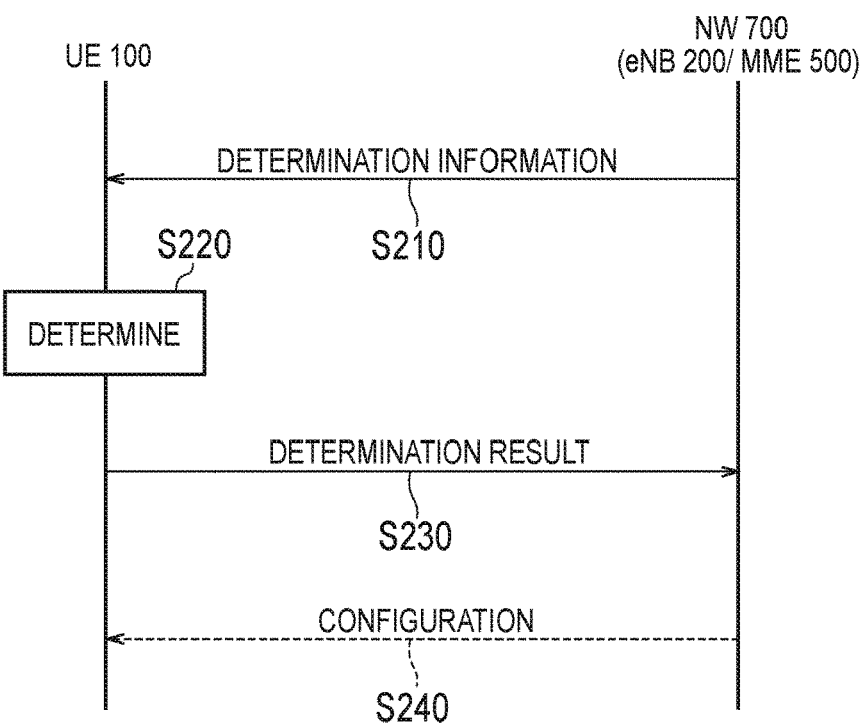
FIG. 9 is a sequence diagram for describing an operation according to a second embodiment.

Next, an operation according to a second embodiment will be described with reference to FIG. 9. FIG. 9 is a sequence diagram for describing the operation according to the second embodiment. Description of parts similar to those in the first embodiment will be omitted where appropriate.

In the above-described first embodiment, the NW 700 determines whether or not the communication by the WLAN transceiver 112 can be configured. In the second embodiment, the UE 100 determines whether or not the communication by the WLAN transceiver 112 can be configured.

As illustrated in FIG. 9, in step S210, the NW 700 notifies the UE 100 of determination information for determining whether the UE 100 is legally authenticated for transmission by the WLAN transceiver 112. The UE 100 receives the determination information via the cellular transceiver 111. The determination information will be described in detail later.

It is noted that the UE 100 may obtain location information by the GNSS receiver 130 (or the GPS receiver), and may use the location information as the determination information. In this case, step S210 may be omitted.

In step S220, the UE 100 determines, based on the authentication related information stored in the memory 150 and the determination information received from the NW 700, whether or not transmission by the WLAN transceiver 112 can be executed in the country where the UE 100 is located. It is noted that the AS layer in the UE 100 may make the determination. In this case, the AS layer may obtain the authentication related information and/or the determination information from the NAS layer in the UE. Alternatively the NAS layer may make the determination. In this case, the NAS layer may obtain the authentication related information and/or the determination information from the AS layer.

For example, the AS layer notifies the NAS layer of the determination information. Based on the authentication related information obtained from the memory 150 and the determination information obtained from the AS layer, the NAS layer determines whether or not transmission by the WLAN transceiver 112 can be executed in the country where the UE 100 is located. The NAS layer notifies the AS layer of the determination result. Alternatively, the AS layer may make the determination and notify the NAS layer of the determination result.

Next, a specific determination method will be described.

Firstly, a case will be described in which the determination information is information indicating the country where the UE 100 is located. For example, the determination information is information indicating a country code. The information indicating the country code may be a PLMN identifier including the information indicating the country code (MCC). In this case, the UE 100 determines whether or not a country indicated by the determination information is included in the stored list information (authentication related information). If the country is included in the list information, the UE 100 determines that transmission by the WLAN transceiver 112 can be executed. Otherwise, the UE 100 determines that transmission by the WLAN transceiver 112 cannot be executed. It is noted that the UE 100 may make the determination by identifying the country where the UE 100 is located, based on the location information obtained via the GNSS receiver 130.

Secondly, a case will be described in which the determination information is carrier information. The carrier information may be a PLMN identifier including information indicating the carrier information (mobile network code: MNC). The UE 100 identifies a country where a carrier (NW operator) indicated by the carrier information operates. After identifying the country where the NW operator operates, if the country is included in the list information, the UE 100 determines that transmission by the WLAN transceiver 112 can be executed. Otherwise, the UE 100 determines that transmission by the WLAN transceiver 112 cannot be executed. It is noted that the UE 100 stores a list in which the carrier and the country where the carrier operates are associated.

Thirdly, a case will be described in which the determination information is bit information (first bit information) configured by a specific bit string. The UE 100 stores, as authentication related information, second bit information constituted of a specific bit string. Depending on a result of an AND operation conducted by using the first bit information and the second bit information, the UE 100 determines whether or not transmission by the WLAN transceiver 112 can be executed.

For example, if the UE 100 is authenticated in a first country and in a second country, the UE 100 holds "11" as the second bit information. The first bit indicates the first country, and the second bit indicates the second country. However, an NW 700 in the first country transmits "10" as the first bit information. As a result of an AND operation by using the first bit information and the second bit information, the UE 100 obtains "10". As the first bit indicates "1", the UE 100 determines that transmission by the WLAN transceiver 112 can be executed. It is noted that the NW 700 in the second country transmits "01" as the first bit information. Thus, upon obtaining "01" as the result of the AND operation, the UE 100 determines that transmission by the WLAN transceiver 112 can be executed.

On the other hand, if the UE 100 is not authenticated in the first country and is authenticated in the second country, the UE 100 holds "01" as the second bit information. Upon obtaining "00" as a result of the AND operation, the UE 100 determines that transmission by the WLAN transceiver 112 cannot be executed.

In step S230, similarly to step S120, the UE 100 notifies the NW 700 of the determination result. The UE 100 may notify the determination result by an RRC message or by a NAS message.

The UE 100 may notify the NW 700 by including the determination result into capability information (Capability) indicating a capability of the UE 100. Alternatively, the UE 100 may notify the NW 700 of the capability information updated on the basis of the determination result. For example, upon determining that transmission by the WLAN transceiver 112 cannot be executed, even if the UE 100 is capable of cellular/WLAN aggregation, the UE 100 can update the capability information and can notify the NW 700 of the capability information indicating that the UE 100 is not capable of cellular/WLAN aggregation.

It is noted that, if a higher layer (NAS layer) in the UE 100 notifies the AS layer in the UE 100 whether or not a capability for WLAN (for example, a capability for cellular/WLAN aggregation) can be used, depending on the determination result, the AS layer may configure whether or not the UE 100 has the capability for WLAN, based on the notification. That is, upon obtaining the authentication from the higher layer, the AS layer may decide a value of the capability information, based on the determination result (notification from the higher layer). In this case, after deciding the value of the capability information, the AS layer notifies the NW 700 of the capability information.

Thus, the UE 100 can update (configure) the capability information by referring to the determination result. The UE 100 can notify the NW 700 of the updated (configured) capability information.

The NW 700 determines whether or not the communication by the WLAN transceiver 112 can be configured to the UE 100, based on the determination result (capability information) received from the UE 100.

Step S240 corresponds to step S140.

As described above, the UE 100 can determine, based on the authentication related information and the determination information, whether or not transmission by the WLAN transceiver 112 can be executed in the country where the UE 100 is located. Based on the determination result of the UE 100, the NW 700 can determine whether or not the communication by the WLAN transceiver 112 can be configured to the UE 100, and thus, illegal usage by the terminal apparatus can be prevented.

(Operation According to Modification of Second Embodiment)

Figure 10:
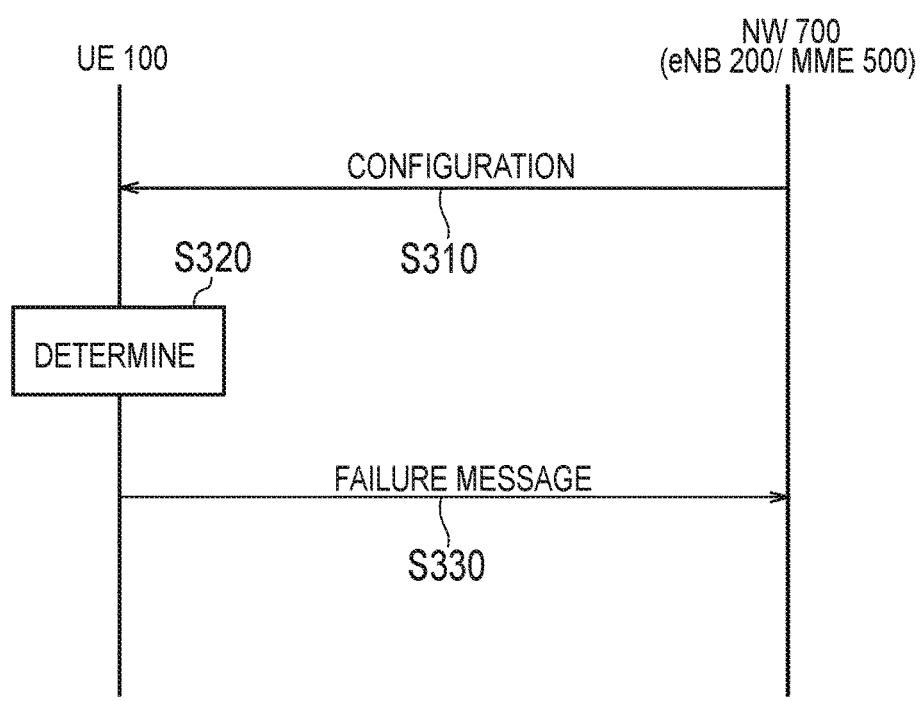
FIG. 10 is a sequence diagram for describing an operation according to a modification of the second embodiment.

Next, an operation according to a modification of the second embodiment will be described with reference to FIG. 10. FIG. 10 is a sequence diagram for describing the operation according to the modification of the second embodiment. Description of parts similar to those in each of the above-described embodiments will be omitted where appropriate.

In step S310, the NW 700 notifies the UE 100 of configuration information (Configuration) indicating a configuration for communication by the WLAN transceiver 112. For example, the NW 700 notifies the UE 100 of the configuration information for cellular/WLAN aggregation, by an RRCConnectionReconfiguration.

In step S320, similarly to step 220, the UE 100 determines whether or not transmission by the WLAN transceiver 112 can be executed in the country where the UE 100 is located. Upon determining that transmission by the WLAN transceiver 112 can be executed, the UE 100 performs a configuration corresponding to the configuration information. In response to the configuration information, the UE 100 notifies the NW 700 of the information based on the determination result. Specifically, the UE 100 transmits an RRCConnectionReconfiguration Complete message. In this case, the NW 700 starts the operation of the cellular/WLAN aggregation.

On the other hand, upon determining that transmission by the WLAN transceiver 112 cannot be executed, the UE 100 does not perform the configuration corresponding to the configuration information. The UE 100 executes, for example, an RRCConnectionReconfiguration failure.

Alternatively, upon determining that transmission by the WLAN transceiver 112 cannot be executed, and after performing the configuration corresponding to the configuration information, the UE 100 disables a function of the communication (transmission) by the WLAN transceiver 112. For example, the UE 100 configures a function of WLAN communication in an SCell (WLAN carrier) configured corresponding to the configuration information, to a deactivated state (Deactive). It is noted that, the deactivated state is a state in which uplink transmission (and downlink reception) is not performed in the configured SCell.

Alternatively, the UE 100 may execute a process of step S330 described below.

In step S330, in response to the configuration information, the UE 100 notifies the NW 700 of information based on the determination result. Specifically, the UE 100 transmits, as a negative acknowledgment, an RRCConnectionReconfiguration Failure message. The UE 100 may include, in the RRCConnectionReconfiguration Failure message, reason information (cause value) indicating that transmission by the WLAN transceiver 112 cannot be executed in the country where the UE 100 is located.

Alternatively, during reestablishment of a connection with the eNB 200 after detecting a radio link failure with the NW 700 (eNB 200), the UE 100 may notify the NW 700 (eNB 200), as a reason for the RRCConnectionReconfiguration Failure message in step S330, that transmission by the WLAN transceiver 112 cannot be executed in the country where the UE 100 is located. Specifically, the UE 100 can include the reason information (cause value) while executing an RRCConnection Reestablishment procedure.

If the reason information indicates that transmission by the WLAN transceiver 112 cannot be executed in the country where the UE 100 is located, the NW 700 decides not to transmit, to the UE 100, configuration information indicating the configuration for the communication by the WLAN transceiver 112. Thus, the NW 700 does not transmit the configuration information to the same UE 100. Alternatively, the NW 700 may notify the UE 100 of configuration information for reception rather than transmission by the WLAN transceiver 112.

[Third Embodiment]

Figure 11:
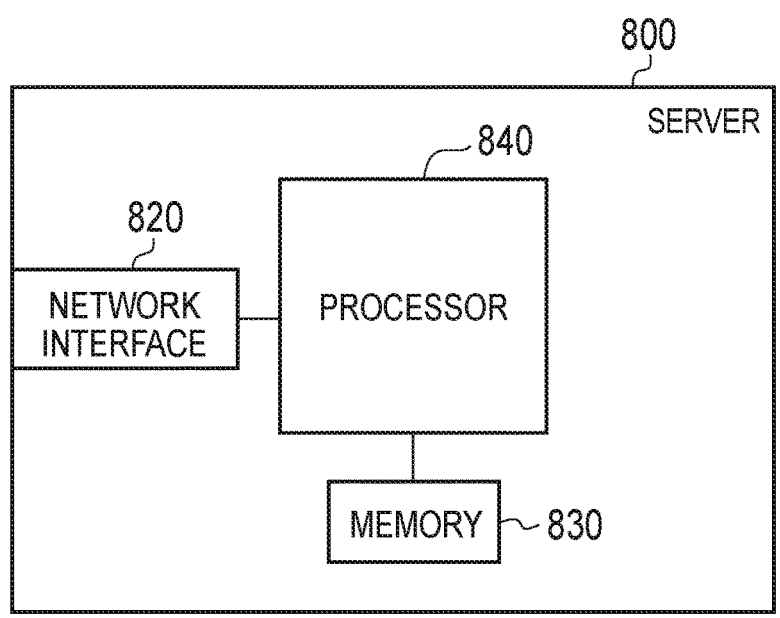
FIG. 11 is a block diagram of a management apparatus configured to manage apparatus information.
Figures 12, 13:
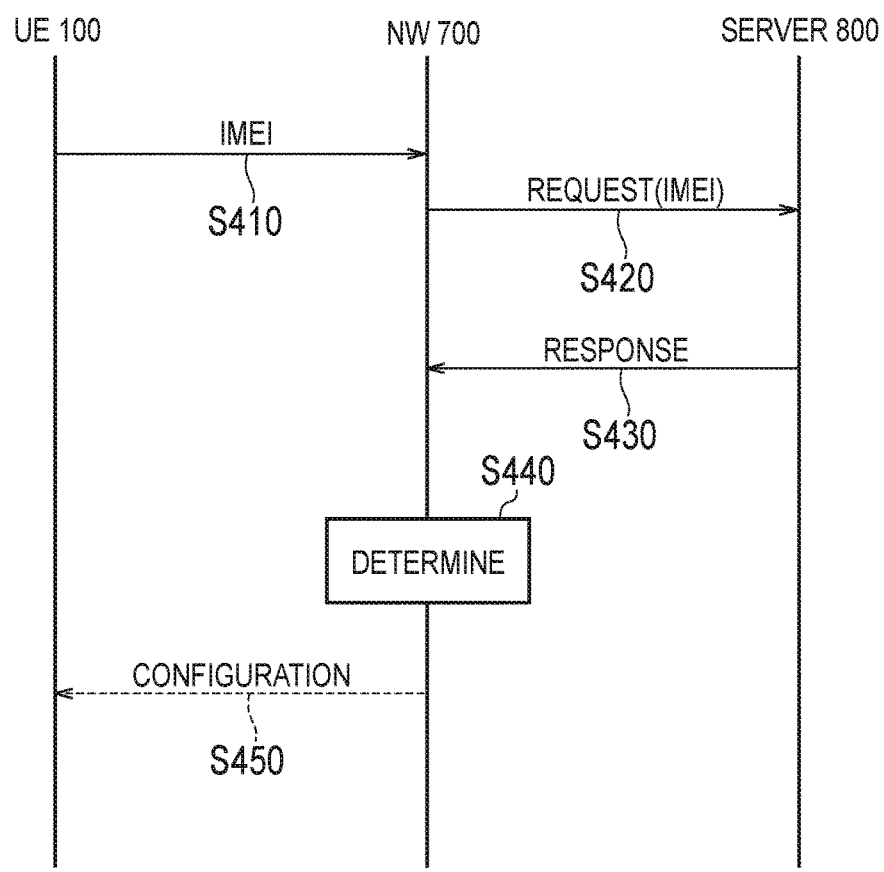
FIG. 12 is a diagram for describing an example of the apparatus information.
FIG. 13 is a sequence diagram for describing an operation according to a third embodiment.

Next, an operation according to a third embodiment will be described with reference to FIG. 11 to FIG. 13. FIG. 11 is a block diagram of a management apparatus (server 800) configured to manage apparatus information. FIG. 12 is a diagram for describing an example of the apparatus information. FIG. 13 is a sequence diagram for describing an operation according to the third embodiment. Description of parts similar to those in each of the above-described embodiments will be omitted where appropriate.

In the third embodiment, the NW 700 determines, based on information about a model identifier of the UE 100 (terminal apparatus), whether or not communication by the WLAN transceiver 112 can be configured.

(Management Apparatus)

In the third embodiment, a management apparatus (server) 800 configured to manage the authentication related information, is present in the network (see FIG. 13). The server 800 may be present in the EPC 20, and may be present in an external network.

The server 800 may be an EIR (equipment identity register) that is a network node configured to manage an apparatus identifier (for example, international mobile station equipment identity (IMEI)) for identifying the UE 100 (terminal apparatus). Alternatively, the server 800 may be an HLR (home location register) including a management function of managing subscriber information, and a call processing function. Alternatively, the server 800 may be another network apparatus (such as an ANDSF server and a server managed by a vendor).

As illustrated in FIG. 11, the server 800 includes a network interface 820, a memory 830, and a processor 840. The memory 830 may be integrally formed with the processor 840, and this set (that is, a chipset) may be used as a processor.

The network interface 820 is connected to the NW 700 (eNB 200/MME 500) via a predetermined interface.

The memory 830 stores a program to be executed by the processor 840 and information to be used for a process by the processor 840. In the present embodiment, the memory 830 stores the apparatus information (see FIG. 12). The apparatus information is information in which information on the model identifier (type allocation code: TAC) indicating a model of the terminal apparatus and the authentication related information (regulation) are associated.

The information on the model identifier may be the model identifier (TAC) itself. Alternatively, the information may be information partly configured by the model identifier. For example, the information may be an IMEI partly configured by the TAC. It is noted that the IMEI is an identifier configured by an 8-digit TAC, an SNR serial number) uniquely assigned to the terminal apparatus, and a 1-digit spare. Alternatively, the information may be an IMEISV (IMEI software version), which is an identifier configured by information obtained by eliminating a spare from the IMEI, and a software version.

In FIG. 12, the authentication related information is list information indicating the country where the UE 100 (terminal apparatus/terminal main body) is legally authenticated for transmission by the WLAN transceiver 112. In FIG. 12, a terminal apparatus whose IMEI (TAC) is A, is authenticated for transmission by the WLAN transceiver 112 in Japan (JP), the United States of America and Canada (USA/Canada), and the European Union (EU). On the other hand, a terminal apparatus whose IMEI (TAC) is B, is authenticated for transmission by the WLAN transceiver 112 in Japan (JP), and the United States of America and Canada (USA/Canada). The terminal apparatus is not authenticated in the European Union (EU).

The apparatus information may be updated corresponding to an update of the UE 100 (terminal apparatus). For example, the authentication related information may be updated as a result of an update in software, that is a driver circuit (driver) and/or an operating system (OS) of the UE 100 (terminal apparatus). Alternatively, apparatus information (authentication related information) may be updated by adding information of a country newly authorizing IEEE specifications, to the authentication related information. It is noted that the apparatus information may be updatable by the NW operator or a vendor handling terminal apparatuses.

The processor 840 includes a baseband processor configured to perform modulation and demodulation, encoding and decoding and the like of a baseband signal, and a CPU configured to perform various processes by executing the program stored in the memory 830. The processor 840 executes various processes described later.

(Operation According to Third Embodiment)

Next, an operation according to a third embodiment will be described with reference to FIG. 13.

As illustrated in FIG. 13, in step S410, the UE 100 notifies, via the cellular transceiver 111, the NW 700 of information on the model identifier. The UE 100 notifies, as information on the model identifier, the IMEI. In response to a request from the NW 700, the UE 100 may notify the NW 700 of the information on the model identifier. The NW 700 receives the information on the model identifier from the UE 100.

In step S420, the NW 700 requests the authentication related information from the server 800. The request includes information (IMEI) on the model identifier received from the UE 100. When determining whether or not the communication by the WLAN transceiver 112 can be configured to the UE 100, the NW 700 may request the authentication related information from the server 800.

It is noted that the NW 700 may not directly request the authentication related information from the server 800. As a result, the NW 700 may notify the server 800 of a signaling for obtaining authentication related information.

In step S430, upon reception of the request, the server 800 notifies the NW 700 of a response to the request. In response to reception of the request, the server 800 includes the authentication related information into the response to the request, based on information (IMEI) on the model identifier included in the request and the apparatus information stored in a DB 500. If the information on the model identifier included in the request is not stored in the server 800, this fact may be included in the response to the request.

By receiving the response to the request, the NW 700 obtains the authentication related information.

In step S440, the NW 700 determines, based on the authentication related information, whether or not the communication by the WLAN transceiver 112 can be configured to the UE 100. Steps S440 and S450 correspond to steps S130 and S140.

As described above, the NW 700 can determine, by receiving only the information on the model identifier from the UE 100, whether or not the communication by the WLAN transceiver 112 can be configured to the UE 100. Thus, illegal usage by the terminal apparatus can be prevented.

[Other Embodiments]

In each of the embodiments described above, the configuration for communication by the WLAN transceiver 112 is not limited to the cellular/WLAN aggregation. For example, the configuration may be a configuration for cellular/WLAN radio interworking technology supported in 3GPP Release 12 and later.

It is noted that, in the cellular/WLAN radio interworking technology, the UE 100 in the RRC connected state or in the RRC idle state performs a bidirectional traffic switching (network selection and traffic steering) between the E-UTRAN 10 and the WLAN 30. The traffic switching is performed at the initiative of UE 100 (UE based) with assistance from the E-UTRAN 10. The traffic switching is performed in APN (Access Point Name) units.

Based on the determination result, the NW 700 may decide whether or not to notify the UE 100 of assistance information used for switching control. Alternatively, the NW 700 may update the assistance information. For example, if the communication by the WLAN transceiver 112 cannot be configured, the NW 700 may notify the UE 100 of the assistance information, as configuration information, by which traffic switching to the WLAN 30 is not possible.

It is noted that the assistance information includes: a strength (received power) threshold value and a quality threshold value of an E-UTRAN signal; a threshold value of a WLAN channel usage rate; a threshold value of a WLAN backhaul data rate; a strength (received power) threshold value and a quality threshold value of a WLAN signal; and the like. The assistance information may include a WLAN identifier on which the UE-based switching control is performed. The WLAN identifier is an SSID, BSSID, HESSID, and the like. The assistance information may include a parameter that designates a period during which a threshold value (determination condition) should be satisfied.

It is noted that, in the cellular/WLAN radio interworking technology, traffic switching to the WLAN 30 is performed at the initiative of the UE. Therefore, upon determining that illegal usage by the terminal apparatus does not occur, the NW 700 may notify the UE 100 of the configuration information about the cellular/WLAN radio interworking, without performing the determination described above.

Furthermore, the configuration for communication by the WLAN transceiver 112 may be a configuration for a licensed-assisted access (LAA) technology proposed in 3GPP Release 12 and later.

In the LAA, the UE 100 communicates with a cell operated in a licensed band (hereinafter, a licensed cell) and a cell operated in an unlicensed band (hereinafter, an unlicensed cell). The licensed cell may be used as a PCell and the unlicensed cell may be used as an SCell (or PSCell). If the UE 100 communicates with the licensed cell and the unlicensed cell, the licensed cell and the unlicensed cell may be managed by one node (for example, the eNB 200). It is noted that, if the licensed cell and the unlicensed cell are managed (controlled) by one eNB 200, the unlicensed cell (and the licensed cell) may be formed by a remote radio head (RRH) including a radio transceiver. Alternatively, the licensed cell may be managed by the eNB 200 and the unlicensed cell may be managed by a radio communication apparatus different from the eNB 200. The eNB 200 and the radio communication apparatus may exchange, via a predetermined interface (an X2 interface or an S1 interface), various types of information described later. The eNB 200 configured to manage the licensed cell may notify the radio communication apparatus of information obtained from the UE 100, and may notify the UE 100 of information obtained from the radio communication apparatus.

In the unlicensed band, in order to avoid interference with a system different from an LTE system (such as wireless LAN) or an LTE system of another operator, it is required to execute a CCA (Clear Channel Assessment) (so called Listen Befor Tolk (LBT)) before transmitting a radio signal. Specifically, in the CCA, in order to confirm whether or not frequency (carrier) in the unlicensed band is available, the eNB 200 measures interference power. The eNB 200 allocates, based on a measurement result of the interference power, a radio resource included in a frequency (carrier) confirmed to have an available channel, to the UE 100 (scheduling). The eNB 200 performs scheduling in the unlicensed cell via the unlicensed cell. Alternatively, the eNB 200 may perform scheduling in the unlicensed cell via the licensed cell (that is, cross-carrier scheduling).

Based on a determination result, the NW 700 may decide whether or not to notify the UE 100 of the configuration information for executing the LAA.

Further, in the above-described second embodiment, upon execution, for example, of the configuration of cellular/WLAN aggregation on the UE 100, corresponding to the measurement result of the radio condition of the WLAN communication, the NW 700 may notify the UE 100 of the configuration information for measuring a radio condition of the WLAN communication. The UE 100 may perform a configuration corresponding to the configuration information.

Here, upon determining that transmission by the WLAN transceiver 112 cannot be executed, the UE 100 that performed the configuration, may notify the NW 700 of a request to remove the configuration, as a determination result. For example, the UE 100 may notify the NW 700 of the request by a UE assistance information message. In response to reception of a request to remove a measurement configuration of the radio condition of the WLAN communication, the NW 700 can determine that the communication by the WLAN transceiver 112 cannot be configured.

Further, in the above-described second embodiment, the UE 100 may perform the above-described determination, based on an operation from a user. For example, in the modification of the second embodiment, in response to reception of the configuration information of S310, the UE 100 may display a message on a display for confirming whether or not the UE 100 is legally authenticated for communication by the WLAN transceiver 112 in the country where the UE 100 is located. After confirming if a technical conformity mark is affixed to the UE 100 (terminal apparatus), the user performs, for example, a predetermined operation. Upon confirmation, by the operation from the user, that the UE 100 is legally authenticated, the UE 100 determines that the transmission by the WLAN transceiver 112 can be executed. Otherwise, the UE 100 determines that transmission by the WLAN transceiver 112 cannot be executed.

Furthermore, in the above-described third embodiment, the NW 700 may store the apparatus information.

Further, in each of the above-described embodiments, the NW 700 may notify the target eNB of the determination result (or the capability information), during execution of a handover procedure on the UE 100. For example, determination information may be included in a handover request.

Further, in each of the above-described embodiments, a case has been described where the UE 100 is authenticated based on laws or ordinances in each country; however, this is not limiting. For example, if the UE 100 is authenticated based on laws or ordinances in a region (a plurality of countries (such as the European Union) provinces and the like), it is evident that an operation similar to the operation described above may be executed. Therefore, it is possible to replace "country" with "region" in the description above.

The operations according to each of the above-described embodiments are not limited to a case in which these operations are performed separately, and operations according to two or more embodiments may be combined and performed.

In each of the above-described embodiments, as one example of a cellular communication system, the LTE system is described; however, the present application is not limited to the LTE system, and the present application may be applied to systems other than the LTE system. Specifically, in the above-described embodiment, a case is described where authentication of the UE 100 (terminal apparatus) is required for transmission using WLAN; however, this is not limiting. If authentication of the UE 100 is required for transmission using another RAT, an operation similar to the operation described above may be executed.

[Cross Reference to Related Applications]

The entire content of Japanese Patent Application No. 2015-035686 (filed on Feb. 25, 2015) is incorporated in the present specification by reference.

INDUSTRIAL APPLICABILITY

The present application is useful in the field of communication.

The invention claimed is:

1. A network apparatus configured to perform communication with a user terminal comprising a first communication unit configured to perform communication using a first radio access technology and a second communication unit configured to perform communication using a second radio access technology, by using the first access technology, the network apparatus comprising:
　a receiver configured to receive, from the user terminal, authentication related information on one or more countries where the user terminal is legally authenticated for transmission by the second communication unit; and
　a controller configured to determine, based on the authentication related information, whether or not communication by the second communication unit can be configured to the user terminal, wherein
　the authentication related information is image information indicating the one or more countries where the user terminal is legally authenticated, and
　the controller is configured to determine that the communication by the second communication unit can be configured to the user terminal, if the image information includes an image applied to a terminal apparatus legally authenticated in the country where the user terminal is located.

2. The network apparatus according to claim 1, wherein the authentication related information is based on information input by a user operation to the user terminal.

3. The network apparatus according to claim 1, wherein the controller notifies the user terminal of configuration information indicating a configuration for the communication by the second communication unit, upon determining that the communication by the second communication unit can be configured to the user terminal.

4. A network apparatus configured to perform communication with a user terminal comprising a first communication unit configured to perform communication using a first radio access technology and a second communication unit configured to perform communication using a second radio access technology, by using the first access technology, the network apparatus comprising:
　a receiver configured to receive, from the user terminal, authentication related information on one or more countries where the user terminal is legally authenticated for transmission by the second communication unit; and
　a controller configured to determine, based on the authentication related information, whether or not communication by the second communication unit can be configured to the user terminal, wherein
　the controller is configured to determine that the user terminal can be configured to allow for reception rather than transmission by the second communication unit, if the user terminal is not legally authenticated for the transmission by the second communication unit in the country where the user terminal is located.

5. A user terminal comprising a first communication unit configured to perform communication by a first radio access technology and a second communication unit configured to perform communication by a second radio access technology, comprising:
　a storage unit configured to store authentication related information on one or more countries where the user terminal is legally authenticated for transmission by the second communication unit; and
　a controller configured to obtain, via the first communication unit, determination information for determining whether or not the user terminal is legally authenticated for transmission by the second communication unit in a country where the user terminal is located, wherein
　the controller determines, based on the authentication related information and the determination information, whether or not the transmission by the second communication unit can be executed in the country where the user terminal is located,
　the controller notifies a network apparatus, via the first communication unit, of information based on a result of the determination, the controller updates, based on the result of the determination, capability information of the user terminal, and the controller notifies the network apparatus of the updated capability information as information based on the result of the determination.

6. A user terminal comprising a first communication unit configured to perform communication by a first radio access technology and a second communication unit configured to perform communication by a second radio access technology, comprising:
- a storage unit configured to store authentication related information on one or more countries where the user terminal is legally authenticated for transmission by the second communication unit; and
- a controller configured to obtain, via the first communication unit, determination information for determining whether or not the user terminal is legally authenticated for transmission by the second communication unit in a country where the user terminal is located, wherein
the controller determines, based on the authentication related information and the determination information, whether or not the transmission by the second communication unit can be executed in the country where the user terminal is located, the controller notifies a network apparatus, via the first communication unit, of information based on a result of the determination, the first communication unit receives a predetermined message about a communication configuration using the second radio access technology, and the controller notifies the network apparatus of the information based on the result of the determination as a response to the predetermined message.

7. The user terminal according to claim 6, wherein the controller includes, if notifying a negative acknowledgment to the predetermined message, reason information indicating that the user terminal is not legally authenticated for transmission by the second communication unit, into the negative acknowledgment.

8. The user terminal according to claim 6, wherein the controller notifies a negative acknowledgment to the predetermined message, and the controller notifies, during reestablishment of a connection with a base station after detecting a radio link failure, that the user terminal is not legally authenticated for transmission by the second communication unit, as a reason for the negative acknowledgment.

* * * * *